(12) United States Patent
Song et al.

(10) Patent No.: US 12,554,749 B2
(45) Date of Patent: Feb. 17, 2026

(54) DRIFTING BUOY TRAJECTORY PREDICTION METHOD BASED ON HYBRID NEURAL NETWORK PREDICTION MODEL

(71) Applicant: Institute of Oceanographic Instrumentation, Shandong Academy of Sciences, Qingdao (CN)

(72) Inventors: Miaomiao Song, Qingdao (CN); Wei Hu, Qingdao (CN); Shixuan Liu, Qingdao (CN); Jiming Zhang, Qingdao (CN); Xiao Fu, Qingdao (CN); Wenqing Li, Qingdao (CN); Shanshan Zheng, Qingdao (CN); Keke Zhang, Qingdao (CN)

(73) Assignee: Institute of Oceanographic Instrumentation, Shandong Academy of Sciences, Qingdao (CN)

( * ) Notice: Subject to any disclaimer, the term of this patent is extended or adjusted under 35 U.S.C. 154(b) by 0 days.

(21) Appl. No.: 19/093,470

(22) Filed: Mar. 28, 2025

(65) Prior Publication Data

US 2025/0307275 A1  Oct. 2, 2025

(30) Foreign Application Priority Data

Mar. 29, 2024 (CN) .......................... 202410371023.7

(51) Int. Cl.
*G06F 16/29* (2019.01)
*B63B 22/00* (2006.01)
(Continued)

(52) U.S. Cl.
CPC .............. *G06F 16/29* (2019.01); *B63B 22/00* (2013.01); *G06N 3/0442* (2023.01); *G06N 3/0464* (2023.01); *B63B 2022/006* (2013.01)

(58) Field of Classification Search
CPC .......... G06F 16/29; G06F 18/10; G06F 18/15; G06F 18/213; G06F 2123/02;
(Continued)

(56) References Cited

U.S. PATENT DOCUMENTS

| | | | | |
|---|---|---|---|---|
| 11,585,672 | B1 * | 2/2023 | Dickson | .................. G06F 16/29 |
| 2016/0231302 | A1 * | 8/2016 | Chadwick | .......... G01N 33/1886 |
| 2024/0420344 | A1 * | 12/2024 | Hu | .......................... G06V 10/82 |

FOREIGN PATENT DOCUMENTS

| CN | 115983475 A | * 4/2023 |
|---|---|---|
| CN | 117474168 A | 1/2024 |

OTHER PUBLICATIONS

CNIPA, Notification of a First Office Action for CN202410371023.7, May 10, 2024.

(Continued)

*Primary Examiner* — Nga X Nguyen
(74) *Attorney, Agent, or Firm* — Hemisphere Law, PLLC (57) ABSTRACT

A drifting buoy trajectory prediction method based on a hybrid neural network prediction model, includes: S1, obtaining marine environmental data and historical trajectory data of a drifting buoy; S2, performing preprocessing on the marine environmental data and the historical trajectory data to obtain input data configured to predict northward and an eastward velocities of the drifting buoy; S3, inputting the input data into the hybrid neural network prediction model to obtain predicted values of the northward and eastward velocities; S4, calculating latitude and longitude coordinates of a trajectory point of the drifting buoy based on the predicted values of the eastward and northward velocities; and S5, predicting, by repeating the step S1-S4, latitude and longitude coordinates of trajectory points of the drifting buoy at multiple time points to obtain a sequence of trajec- (Continued)

tory point coordinates to thereby achieve trajectory prediction of the drifting buoy over a target future period.

7 Claims, 7 Drawing Sheets

(51) Int. Cl.
*G06N 3/0442* (2023.01)
*G06N 3/0464* (2023.01)

(58) Field of Classification Search
CPC ... B63B 22/00; B63B 2022/006; B63B 79/40; G06N 3/0442; G06N 3/0464; G06N 3/044; G06N 3/045; G06N 3/08; Y02A 90/10
See application file for complete search history.

(56) References Cited

OTHER PUBLICATIONS

Institute of Marine Instrumentation, Shandong Academy of Sciences (Applicant), Replacement claims (allowed) of CN202410371023.7, May 22, 2024.
CNIPA, Notification to grant patent right for invention in CN202410371023.7, May 27, 2024.

* cited by examiner

DRIFTING BUOY TRAJECTORY PREDICTION METHOD BASED ON HYBRID NEURAL NETWORK PREDICTION MODEL

CROSS-REFERENCE TO RELATED APPLICATION

This application claims priority to Chinese Patent Application No. 202410371023.7, filed Mar. 29, 2024, which is herein incorporated by reference in its entirety.

TECHNICAL FIELD

The disclosure relates to the field of marine monitoring equipment, and more particularly to a drifting buoy trajectory prediction method based on a hybrid neural network prediction model.

BACKGROUND

Surface drifting buoys are expendable devices that float on an ocean surface. The surface drifting buoys drift with ocean currents to conduct real-time, all-weather, continuous monitoring of marine hydro-meteorological environmental information, and collect data on a wide range of parameters such as wind, temperature, humidity, air pressure, precipitation, ocean currents, ecology, and seawater targets.

Predicting drifting buoy trajectories has significant application value. Before deploying buoys, simulating the drifting buoy trajectories can guide the placement of the buoys to select more valuable and meaningful locations for deployment, thereby achieving precise monitoring. After the deployment, predicting the drifting buoy trajectories can accurately estimate the probability and time of the buoys reaching a target sea area, which allows for the assessment of the deployment value of the buoys. Therefore, predicting the drifting buoy trajectories can improve the spatiotemporal monitoring efficiency of the buoys, which is of great significance and practical value to experts in marine science, data analysts, and equipment maintainers.

The use of machine learning techniques to explore complex relationships between marine environmental factors and to conduct artificial intelligence-based reasoning on the drifting buoy trajectories is gradually becoming a new technological direction, with broad prospects in the field of marine engineering. However, single-structured neural network models are insufficient for accurately predicting the drifting buoy trajectories. The prediction of the drifting buoy trajectories faces the following challenges: 1) how to accurately predict the drifting buoy trajectories in the ocean based on temporal characteristics and spatial variation characteristics of marine environmental factors and historical trajectory information of the buoys themselves; 2) how to organically integrate advantages of various neural network models to establish a hybrid machine learning model with spatiotemporal characteristic extraction and long-term prediction analysis capabilities, and apply the hybrid machine learning model to the prediction of the drifting buoy trajectories.

In view of the foregoing, how to design a nonlinear drifting buoy trajectory prediction method based on large-scale marine environmental data is the technical problem to be solved by the disclosure.

SUMMARY

The disclosure provides a drifting buoy trajectory prediction method based on a hybrid neural network prediction model, utilizing the self-learning capability of artificial neural networks to address the nonlinear fitting problem based on large-scale marine environmental data, thereby accurately predicting the drift trajectory of the drifting buoy.

In order to realize above purposes, the disclosure is achieved by the following technical solutions.

Figure 2:
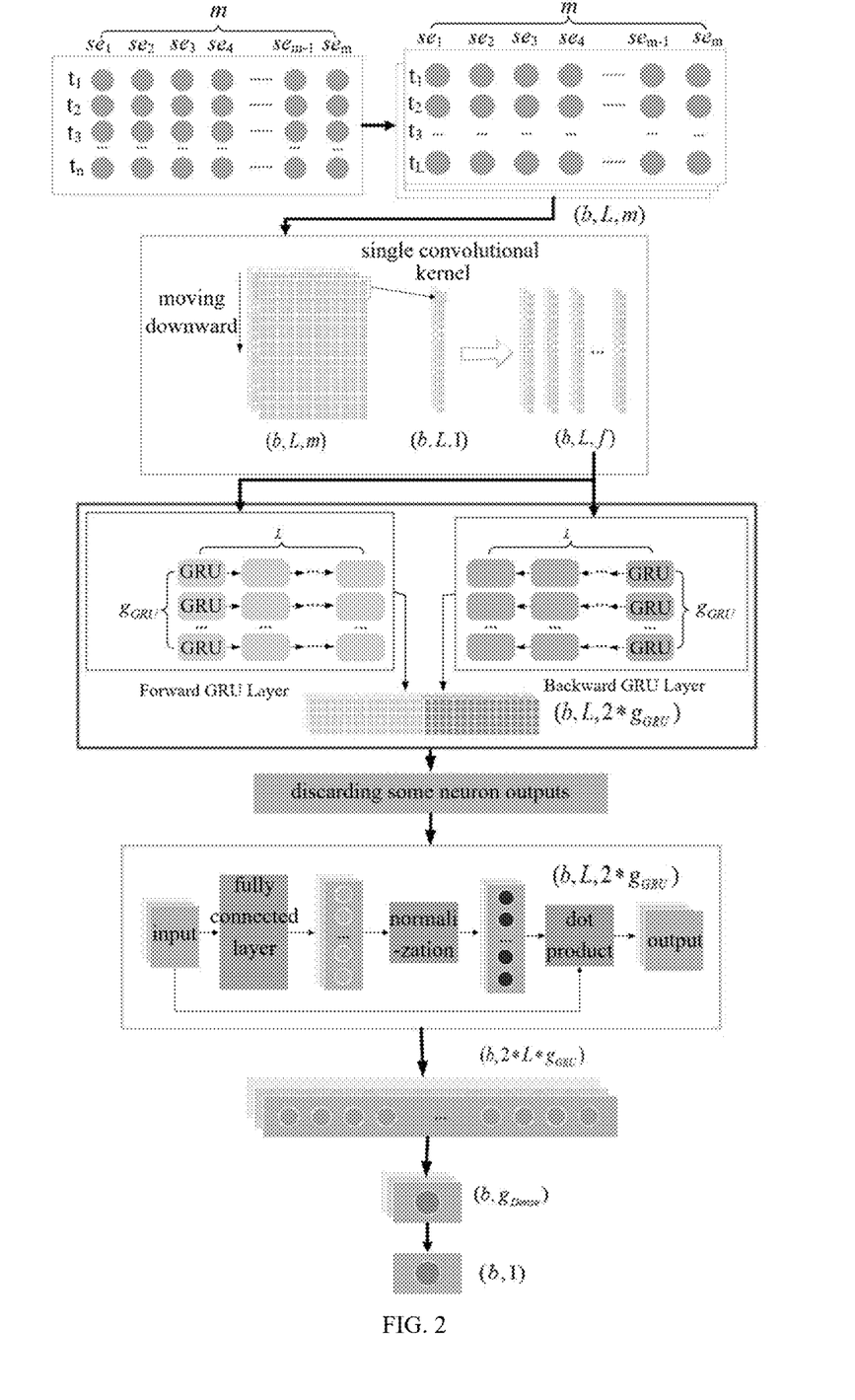
FIG. 2 illustrates a schematic structural diagram of the hybrid neural network prediction model according to the embodiment of the disclosure.

In an aspect, the disclosure provides the drifting buoy trajectory prediction method to calculate future drifting positions according to marine environmental data (including significant wave height, water temperature, surface current, profile current, and sea surface height) and historical positions of the buoy. The drifting buoy trajectory prediction method is based on the hybrid neural network prediction model. The hybrid neural network prediction model, abbreviated as the CNN-BiGRU-Attention model, has six components, including an input layer, a CNN layer, a BiGRU layer, an attention mechanism layer, a flatten layer, and a fully connected layer. A structure of the CNN-BiGRU-Attention model is shown in FIG. 2. The drifting buoy trajectory prediction method is implemented as follows:

S1, obtaining marine environmental data and historical trajectory data of a drifting buoy within a same spatiotemporal range;

S2, performing preprocessing on the marine environmental data and the historical trajectory data of the drifting buoy to obtain input data configured to predict a northward velocity of the drifting buoy and input data configured to predict an eastward velocity of the drifting buoy;

S3, injecting the input data configured to predict the northward velocity of the drifting buoy into the hybrid neural network prediction model to obtain a predicted value of the northward velocity of the drifting buoy and injecting the input data configured to predict the eastward velocity of the drifting buoy into the hybrid neural network prediction model to obtain a predicted value of the eastward velocity of the drifting buoy, where the hybrid neural network prediction model includes:

an input layer, configured to extract the marine environmental data, historical data of the northward velocity of the drifting buoy and historical data of the eastward velocity of the drifting buoy to obtain sample data;

a convolutional neural network (CNN) layer, configured to extract features from the sample data input by the input layer according to a formula expressed as follows:

$$v_{i,j}^l = \delta\left(\sum_{k=0}^{F-1}\sum_{m=0}^{F-1} w_{k,m} V_{i+k,j+m}^{l-1}\right)$$

where F represents a number of rows of a convolutional kernel and also represents a number of columns of the convolutional kernel, $v_{i,j}^l$ represents a value at an i-th row and a j-th column of an l-th layer of the sample data, $w_{k,m}$ represents a weight value at a k-th row and an m-th column of the convolutional kernel of the sample data, $\delta$ represents an activation function, and $$V_{i+k,j+m}^{l-1}$$

represents a value at an i+k-th row and a j+m-th column of an l−1-th layer of the sample data;

a bidirectional gated recurrent unit (BiGRU) layer, configured to extract temporal features from data output by the CNN layer according to a formula expressed as follows:

$$h_t = (1 - z_t) \odot h_{t-1} + z_t \odot \tilde{h}_t$$

where $h_t$ represents an output result of the BiGRU layer, $z_t$ represents an output result of an update gate, $h_{t-1}$ represents a hidden state at time t−1, and $\tilde{h}_t$ represents a candidate state;

an attention mechanism layer, configured to focus on key factors affecting drift of the drifting buoy from data output by the BiGRU layer;

a flatten layer, configured to reduce a dimension of data output by the attention mechanism layer; and a fully connected layer, configured to receive processed data output by the flatten layer and calculate, based on the processed data, the predicted value of the eastward velocity of the drifting buoy and the predicted value of the northward velocity of the drifting buoy;

S4, calculating latitude and longitude coordinates of a trajectory point of the drifting buoy based on the predicted value of the eastward velocity of the drifting buoy and the predicted value of the northward velocity of the drifting buoy; and S5, predicting, by repeating the step S1 to the step S4, latitude and longitude coordinates of trajectory points of the drifting buoy at multiple future time points in chronological order to obtain a sequence of trajectory point coordinates to thereby achieve trajectory prediction of the drifting buoy over a target future period.

In an embodiment, the drifting buoy trajectory prediction method further includes: determining, based on the sequence of trajectory point coordinates, a predicted trajectory of the drifting buoy, determining a sailing route of a ship based on the predicted trajectory of the drifting buoy, and controlling the ship to sail along the sailing route to avoid navigation risks and ensure navigation safety.

In an embodiment, the drifting buoy trajectory prediction method is implemented by a computer including a processor, a memory connected to the processor and a display connected to the processor.

In an embodiment, the drifting buoy trajectory prediction method further includes: determining by the computer, based on the sequence of trajectory point coordinates, a predicted trajectory of the drifting buoy; determining by the computer, based on the predicted trajectory, a safe navigation area and a dangerous navigation area and generating early warning information containing the safe navigation area and the dangerous navigation area; sending, by the computer, the early warning information to a mobile device of a seafarer; and displaying the early warning information on a map displayed on a display of the mobile device for reminding the seafarer to navigate within the safe navigation area and avoid the dangerous navigation area.

In an embodiment, in the step S1, the marine environmental data includes: forecast values of wave (i.e., significant wave height), a water temperature, surface current, profile current, and a sea surface height.

In an embodiment, in the step S2, the performing preprocessing includes: missing data filling, data upsampling, spatial interpolation, data spatiotemporal alignment, and normalization calculations.

In an embodiment, in the step S2, the performing preprocessing on the marine environmental data and the historical trajectory data of the drifting buoy to obtain input data configured to predict a northward velocity of the drifting buoy and input data configured to predict an eastward velocity of the drifting buoy includes:

calculating, according to latitude and longitude coordinates of trajectory points of the historical trajectory data of the drifting buoy, the historical drift velocities of the drifting buoy;

calculating the historical data of the northward velocity of the drifting buoy and the historical data of the eastward velocity of the drifting buoy from the historical drift velocities of the drifting buoy; and combining the historical data of the northward velocity of the drifting buoy with the marine environmental data obtained in the step S1 to obtain the input data configured to predict the northward velocity of the drifting buoy, and combining the historical data of the eastward velocity of the drifting buoy with the marine environmental data obtained in the step S1 to obtain the input data configured to predict the eastward velocity of the drifting buoy.

In an embodiment, the sample data includes: sample features and sample labels, the sample features include spatiotemporal aligned marine environmental data and spatiotemporal aligned historical drift velocities, and the sample labels include the spatiotemporal aligned historical drift velocities of the drifting buoy corresponding to sample features.

In an embodiment, the attention mechanism layer is configured to focus on the key factors affecting the drift of the drifting buoy from the data output by the BiGRU layer as follows:

$$s = \sum_t a_t h_t$$

where s represents an output result of the attention mechanism layer, $h_t$ represents the output result of the BiGRU layer which is input into the attention mechanism layer, and $a_t$ represents a weight of $h_t$.

In an embodiment, the step S5 includes:

performing denormalization through the min-max normalization method on the predicted value of the eastward velocity of the drifting buoy and the predicted value of the northward velocity of the drifting buoy to obtain an actual value of the eastward velocity of the drifting buoy and an actual value of the northward velocity of the drifting buoy, calculating a drift velocity and a vector of the drifting buoy, calculating a drift distance of the drifting buoy through fourth-order Runge-Kutta time integration, and obtaining, through spherical geometry calculation, the latitude and longitude coordinates of the trajectory points of the drifting buoy and the sequence of trajectory point coordinates, where the sequence of trajectory point coordinates is a predicted trajectory of the drifting buoy.

In an embodiment, the hybrid neural network prediction model is embodied by at least one processor and at least one memory coupled to the at least one processor, and the at least one memory stores computer programs executable by the at least one processor.

Compared with the related art, the disclosure has the following advantages and positive effects: Compared with single-structured neural network models, the hybrid neural network prediction model is used in the disclosure to predict the drift trajectory of the drifting buoy. The disclosure realizes the extraction and mining of spatiotemporal features of the marine environmental data, enhances the model generalization ability and the accuracy of drifting buoy trajectory prediction, can effectively avoid gradient explosion and vanishing, can address the nonlinear trajectory prediction problem of surface drift buoys based on large-scale marine environmental data, and has strong robustness.

BRIEF DESCRIPTION OF DRAWINGS

In order to provide a clearer explanation of embodiments of the disclosure or the technical solutions in the related art, the accompanying drawings required for describing the embodiments or the related art are briefly introduced below. It is apparent that the accompanying drawings described below are some embodiments of the disclosure. For those skilled in the art, other drawings can be obtained based on these drawings without requiring creative labor.

DETAILED DESCRIPTION OF EMBODIMENTS

In order to clarify the purpose, technical solution, and advantages of embodiments of the disclosure, a clear and complete description of the technical solution in the embodiments of the disclosure is provided below in conjunction with the accompanying drawings. Apparently, the illustrated embodiments are a part of the embodiments of the disclosure, not all of them. Based on the embodiments of the disclosure, all other embodiments obtained by those skilled in the art without creative labor are within the scope of protection of the disclosure.

It should be noted that in the description of the disclosure, the terms such as "up", "down", "left", "right", "vertical", "horizontal", "inside", "outside" and other directional or positional relationships are based on the directional or positional relationships shown in the accompanying drawings. This is only for ease of description and does not indicate or imply that the device or element must have a specific orientation, or be constructed and operated in a specific orientation, and therefore cannot be understood as a limitation of the disclosure. In addition, the terms "first" and "second" are only used for descriptive purposes and cannot be understood as indicating or implying relative importance.

In the disclosure, unless otherwise specified and limited, the terms "installed" and "connected", etc. should be broadly understood, for example, it can be a fixed connection, a detachable connection, or an integral connection; it can be a mechanical connection or an electrical connection; it can be a direct connection, an indirect connection through an intermediate medium, or an internal connection between two components. For those skilled in the art, the specific meanings of the above terms in the disclosure can be understood according to the specific situation.

In the disclosure, unless otherwise specified and limited, a first feature being "on" or "under" a second feature may include direct contact between the first and second features, or may include contact between the first and second features through another feature between them instead of direct contact. Moreover, the first feature being "on" and "above" the second feature includes the first feature being directly above and diagonally above the second feature, or simply indicating that the first feature is horizontally higher than the second feature. The first feature being "under" and "below" the second feature includes the first feature being directly below and diagonally below the second feature, or simply indicating that the first feature has a lower horizontal height than the second feature.

Many different embodiments or examples for implementing different structures of the disclosure are provided below. In order to simplify the description of the disclosure, specific examples of components and settings are described below. Of course, they are only examples and are not intended to limit the disclosure. In addition, the disclosure may repeat reference numbers and/or reference letters in different embodiments for the purpose of simplification and clarity, and does not indicate the relationship between the various embodiments and/or settings discussed. In addition, the disclosure provides various specific examples of processes and materials, but those skilled in the art may be aware of the application of other processes and/or the use of other materials.

As shown in FIG. 1 to FIG. 7, an embodiment of the disclosure provides a drifting buoy trajectory prediction method based on a hybrid neural network prediction model, using the hybrid neural network prediction model to accurately predict the moving trajectory of the drifting buoy.

Figure 1:
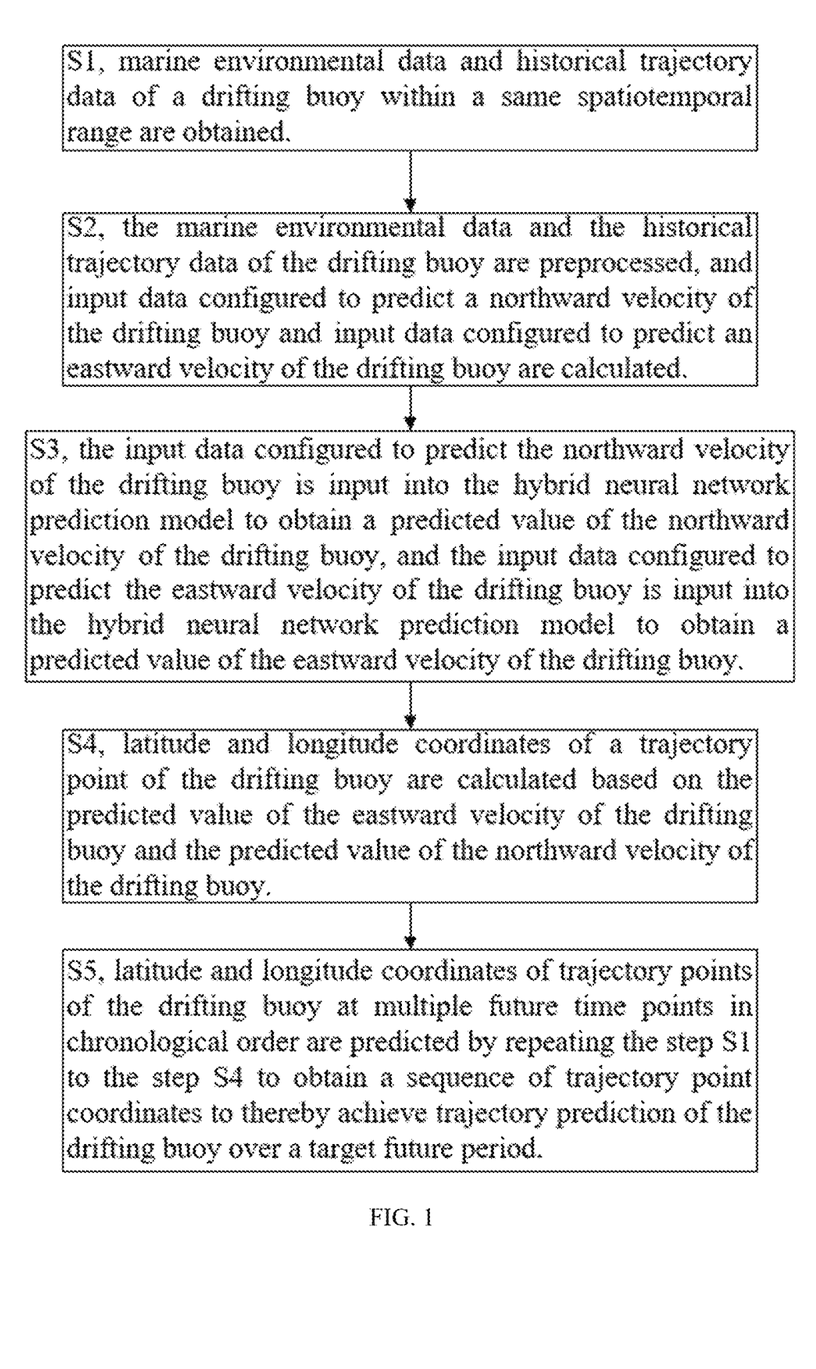
FIG. 1 illustrates a flowchart of a drifting buoy trajectory prediction method based on a hybrid neural network prediction model according to an embodiment of the disclosure.

The drifting buoy trajectory prediction method based on the hybrid neural network prediction model includes the following steps S1-S5.

S1, marine environmental data and historical trajectory data of a drifting buoy within a same spatiotemporal range are obtained.

The obtaining pathways include automatically downloading numerical forecast data of the marine environmental data such as significant wave height, water temperature, surface current, profile current, and sea surface height within a specific spatial and temporal range from major operational research institutions worldwide, such as the national oceanic and atmospheric administration (NOAA) of the United States, the national centers for environmental prediction (NCEP), and the European center for medium-range weather forecasts. Additionally, the historical trajectory data of the drifting buoy within the same spatiotemporal range is automatically downloaded from the global drifter program (GDP) data center. The data are continuously updated and supplemented.

S2, preprocessing is performed on the marine environmental data and the historical trajectory data of the drifting buoy obtained in the step S1 to obtain input data configured to predict a northward velocity of the drifting buoy and input data configured to predict an eastward velocity of the drifting buoy.

The preprocessing includes: missing data filling, data upsampling, spatial interpolation, data spatiotemporal alignment, and normalization calculations, specifically including following steps.

First, latitude and longitude coordinates of trajectory points of the historical trajectory data of the drifting buoy are processed, and historical drift velocities of the drifting buoy are calculated and then decomposed into vectors to obtain historical data of the northward velocity of the drifting buoy and historical data of eastward velocity of the drifting buoy, subsequently, the historical data of the northward velocity of the drifting buoy and the historical data of the eastward velocity of the drifting buoy are temporally and spatially aligned and concatenated with the marine environmental data to form the input datasets configured to predict the northward velocity of the drifting buoy and the eastward velocity of the drifting buoy, respectively, afterward, each feature dimension of the input datasets is normalized using a min-max normalization method. Normalization ensures that all historical trajectory data of the drifting buoy is within the same range and on the same magnitude order, which facilitates faster convergence to the optimal solution and enhances the precision of learning.

Finally, for each drifting buoy, two n×m feature matrices corresponding to normalized eastward velocity and normalized northward velocity respectively are obtained. These matrices represent the input data configured to predict the northward velocity of the drifting buoy and the input data configured to predict the eastward velocity of the drifting buoy.

S3, the input data configured to predict the northward velocity of the drifting buoy is input into the hybrid neural network prediction model to obtain a predicted value of the northward velocity of the drifting buoy, and the input data configured to predict the eastward velocity of the drifting buoy is input into the hybrid neural network prediction model to obtain a predicted value of the eastward velocity of the drifting buoy.

The hybrid neural network prediction model includes one-dimensional CNN layer computations based on time series, bidirectional gated recurrent neural network computations that support long-term sequence calculation, and attention-enhanced computations that focus on key feature information. Additionally, a certain proportion of neurons are set to be inactivated between layers to reduce overfitting. The hybrid neural network prediction model, abbreviated as the CNN-BiGRU-Attention model, includes an input layer, a CNN layer, a BiGRU layer, an attention mechanism layer, a flatten layer, and a fully connected layer. A structure of the CNN-BiGRU-Attention model is shown in FIG. 2, The meanings of the signs in FIG. 2 are as follows.

$se_m$ represents an m-th data of marine environmental element.

$t_1$, $t_2$, $t_3$, $t_L$ and $t_n$ represent time points.

n represents a number of the time points in the input datasets.

m represents a number of marine environmental elements.

b represents a size of a batch of samples.

L represents a time step length.

f represents a number of convolutional kernels.

GRU represents a gated recurrent unit.

gGRU represents a number of the gated recurrent neural units.

gDense represents a number of neural units in the fully connected layer.

Specific implementation is as follows.

When constructing the CNN-BiGRU-Attention model, hyperparameters including: a learning rate, a number of iterations (epoch), a batch size (b), a loss function, the time step length (L), the size (c) and the number (f) of the convolutional kernels of the CNN layer, the number of neural units ($g_{GRU}$) in the BiGRU are first set.

Subsequently, the CNN-BiGRU-Attention model iteratively trains on the datasets to obtain trained model parameters, the trained model parameters are saved to a model file to obtain a trained model file, the trained model file is invoked, and the two n×m feature matrices obtained in the step S2 are input into the CNN-BiGRU-Attention model for computation to obtain the predicted values of the eastward and northward velocities (i.e., the predicted value of the eastward velocity of the drifting buoy and the predicted value of the northward velocity of the drifting buoy) for a next time step, and the predicted values of the eastward and northward velocities are stored in a file or database, followed by entering a next iteration. After multiple iterations, a sequence of the predicted values of the eastward and northward velocities is obtained.

The input layer is configured to extract the marine environmental data and the historical data of the northward velocity of the drifting buoy and the historical data of the eastward velocity of the drifting buoy to obtain sample data.

The marine environmental data and the historical drift velocities of the drifting buoy are extracted, spatiotemporal alignment is performed on the extracted marine environmental data with the extracted historical drift velocities of the drifting buoy to make each of the extracted marine environmental data correspond to a corresponding drift velocity of the extracted historical drift velocities of the drifting buoy at a corresponding moment and thereby obtain spatiotemporal aligned marine environmental data and spatiotemporal aligned historical drift velocities of the drifting buoy, and the spatiotemporal aligned marine environmental data and the spatiotemporal aligned historical drift velocities of the drifting buoy are taken as sample features and the spatiotemporal aligned historical drift velocities of the drifting buoy respectively corresponding to the spatiotemporal aligned marine environmental data are taken as sample labels to form data in a shape of (n, m), where n represents a sample number, and m represents an attribute feature dimension.

The process is as follows. The sample features and the sample labels are normalized by a min-max normalization method to obtain normalized data with dimensions (n, m), where a formula for the min-max normalization method is as follows:

$$x' = \frac{x - \min(x)}{\max(x) - \min(x)}$$

where x' represents a normalized value, x represents an original value of the sample data, min(x) represents a minimum value of the original value of the sample data, and max(x) represents a maximum value of the original value of the sample data.

Mini-batch splitting is performed on the normalized data to obtain mini-batch samples corresponding multiple batches, as the sample data, a size of each of the multiple batches is b, a number of the mini-batch samples is ((n/b)+1), and the mini-batch samples have a shape of (b, L, m) to meet requirements of mini-batch gradient descent computation of each layer of the neural network, where b represents the size of each of the multiple batches, L represents the time step length, and m represents the attribute feature dimension.

The CNN layer is configured to extract features from the sample data input by the input layer.

The sample data of the drifting buoy in the shape of (b, L, m) output from the input layer first enters the CNN layer for feature extraction, the entire CNN layer uses the convolution kernels with the number of f to perform one-dimensional convolution computations on the multiple batches with a size of each batch of b along the time dimension, each convolution kernel convolves along the time axis direction of the sample data to capture local features of the marine environment feature data and the historical drift velocities of the drifting buoy, to thereby form an output in the dimension of (b, L, 1). This process can be defined as:

$$v_{i,j}^l = \delta\left(\sum_{k=0}^{F-1}\sum_{m=0}^{F-1} w_{k,m} V_{i+k,j+m}^{l-1}\right)$$

where F represents a number of rows of a convolutional kernel and also represents a number of columns of the convolutional kernel, $$v_{i,j}^l$$

represents a value at an i-th row and a j-th column of an l-th layer of the sample data $w_{k,m}$ represents a weight value at a k-th row and an m-th column of the convolutional kernel of the sample data, δ represents an activation function, and $$V_{i+k,j+m}^{l-1}$$

represents a value at an i+k-th row and a j+m-th column of an l−1-th layer of the sample data.

In order to better obtain the nonlinear relationships among marine big data and improve the prediction accuracy, in the disclosure, a rectified linear unit (Relu) function is selected as an activation function for the CNN layer. The Relu function can be expressed as:

$$f(x) = \max(0, x).$$

There are the convolution kernels with the total number of f in the CNN layer for feature extraction to generate a three-dimensional feature matrix with the shape of (b, L, f), which realizes the dimension lifting and feature enhancement of the original sample data and is more conducive to integrating data features of the time dimension and data features of the vertical profile dimension, capturing the complex relationships among marine environmental elements, and providing richer time-series feature sequences for the BiGRU layer.

The BiGRU layer is configured to extract temporal features from data output by the CNN layer.

In the embodiment, the hybrid neural network prediction model employs the BiGRU to conduct artificial intelligence reasoning and prediction on the temporal feature data of the drifting buoy, thereby extracting temporal features. The BiGRU consists of several gated recurrent units (GRU) operating in forward and backward directions. The BiGRU trains on forward and backward sequences of the same data, and captures temporal features of the marine environmental data from past and future directions simultaneously, enhancing the generalization ability and prediction accuracy of the hybrid neural network prediction model.

The data output from the CNN layer with the shape (b, L, f) is fed into both the forward GRUs and the backward GRUs of the BiGRU layer. Each neural unit in the GRU performs gating operations at each time step, processes the data input into the BiGRU layer, generates memory states and outputs, and ultimately produces an output with the shape (b, L, l).

Figure 3:
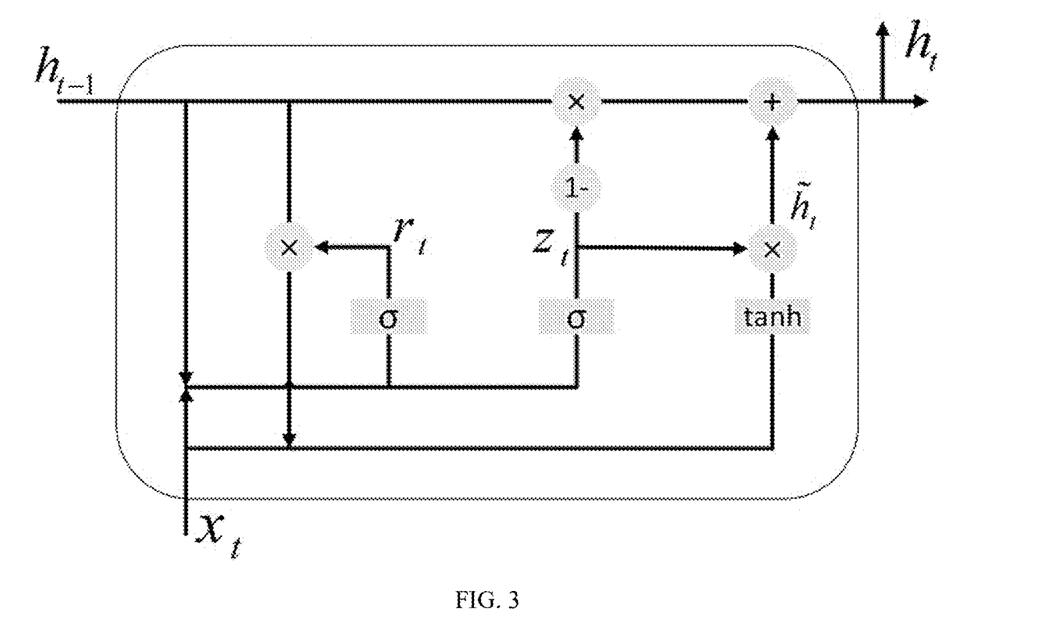
FIG. 3 illustrates a schematic structural diagram of a gated recurrent unit according to the embodiment of the disclosure.

The GRU includes a reset gate and an update gate, with a structure as shown in FIG. 3, and its computational process is described as follows.

(1) Calculation of the reset gate: firstly, based on the data input $x_t$ at the current moment and the hidden state $h_{t-1}$ at the previous moment, the value of the reset gate is calculated. The hidden state is used to carry information from the past. The reset gate $r_t$ is used to control how much the candidate state $\tilde{h}_t$ depends on the hidden state $h_{t-1}$ at the previous moment. The smaller the value of the reset gate, the less information from the hidden state at the previous moment is incorporated. The calculation process is as follows:

$$r_t = \sigma(W_{xr}x_t + U_{hr}h_{t-1} + b_r)$$

where σ represents a sigmoid activation function, $W_{xr}$ represents a weight matrix of the reset gate, $U_{hr}$ represents a self-connection weight between the current moment t and the previous moment t−1 in the reset gate calculation, and $b_r$ represents a bias of the reset gate.

(2) Calculation of the update gate: next, based on the input $x_t$ at the current moment and the hidden state $h_{t-1}$ at the previous moment, the value of the update gate is calculated. The update gate $z_t$ is used to control how much information from the hidden state $h_{t-1}$ at the previous moment should be retained in the hidden state $h_t$ at the current moment and how much information should be accepted from the candidate state $\tilde{h}_t$. The larger the value of the update gate, the more state information from the previous time step is carried over. The calculation process is as follows:

$$z_t = \sigma(W_{xz}x_t + U_{hz}h_{t-1} + b_z)$$

where $W_{xz}$ represents a weight matrix of the update gate, $U_{hz}$ represents a self-connection weight between the current moment t and the previous moment t−1 in the update gate calculation, and $b_z$ represents a bias of the update gate.

(3) Calculation of the candidate state: then, based on the input $x_t$ at the current moment and the hidden state $h_{t-1}$ at the previous moment, the value of the candidate hidden state $\tilde{h}_t$ is calculated. The candidate hidden state is a temporary hidden state used to calculate the final hidden state. The calculation process is as follows:

$$\tilde{h}_t = \tanh(W_{xc}x_t + U_{hc}(r_t \odot h_{t-1}) + b_c)$$

where $\odot$ represents a dot product operation, $W_{xc}$ represents a weight matrix of the candidate state, $U_{hc}$ represents a self-connection weight between the current moment t and the previous moment t−1 in the candidate state calculation, and $b_c$ represents a bias of the candidate state.

(4) Finally, based on the reset gate, the update gate and the candidate hidden state, the hidden state at the current moment is calculated. The final hidden state is the output of the GRU and also serves as the hidden state at the next moment. The calculation process is as follows:

$$h_t = (1 - z_t) \odot h_{t-1} + z_t \odot \tilde{h}_t$$

where $h_t$ represents an output result of the BiGRU layer, $z_t$ represents the output result of the update gate, $h_{t-1}$ represents the hidden state at time t−1, and $\tilde{h}_t$ represents the candidate state.

Each direction of the GRU is provided with neural units with the number of $g_{GRU}$. After the neural units with the number of $g_{GRU}$ extract features at all time steps, the output of the unidirectional GRU is formed, with a shape of (b, L, $g_{GRU}$). The forward GRU and the backward GRU perform the same operations. Then, the outputs of the forward GRU and the backward GRU are concatenated to obtain the output of the entire BiGRU layer, with a shape of (b, L, 2×$g_{GRU}$). To prevent model overfitting, in the embodiment, a dropout layer is placed after the BiGRU layer. The dropout layer can discard some neuron outputs, thereby reducing the dependence of the hybrid neural network prediction model on specific inputs and improving the generalization ability and computational speed of the hybrid neural network prediction model.

An attention mechanism layer is configured to focus on key factors affecting drift of the drifting buoy from data output by the BiGRU layer.

After the data is processed by the BiGRU to extract the temporal features, the attention mechanism layer is established to further extract important features from the data. The output of the BiGRU layer serves as the input to the attention mechanism, enabling the computational model to focus on the key factors that influence the drift motion of the drifting buoy while reducing the attention given to other non-critical factors. During this stage, the dimensionality of the data remains unchanged, still being (b, L, 2×$g_{GRU}$).

Figure 4:
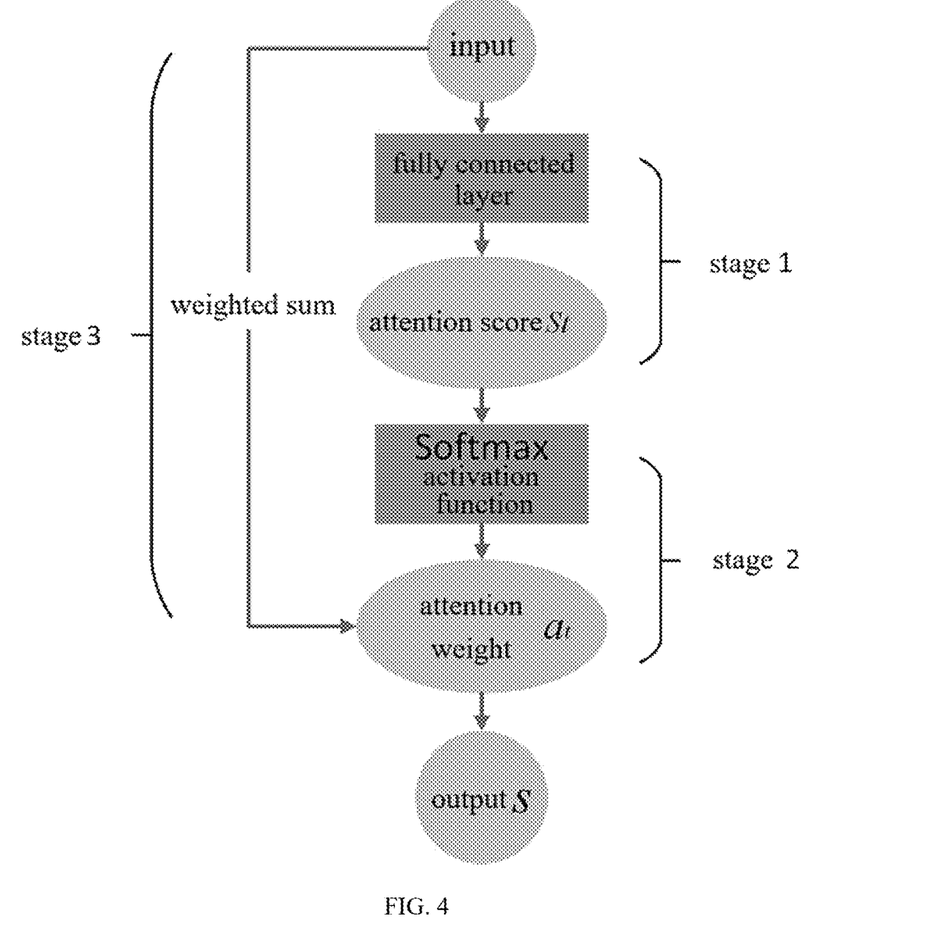
FIG. 4 illustrates a schematic diagram of an attention mechanism layer according to the embodiment of the disclosure.

The schematic diagram of the attention mechanism layer is shown in FIG. 4, and the implementation process of the attention mechanism layer is as follows.

(1) Calculation of attention scores: first, the attention mechanism uses a fully connected layer to compute the attention score for the input data of the attention mechanism at each time step. The weight matrix and bias vector of the fully connected layer are continuously trained and learned through backpropagation. For each time step, elements in the input sequence are transformed through the linear transformation to obtain a corresponding attention score. The attention scores are used to measure the importance of different parts of the input data in the current context. The calculation process is as follows:

$$s_t = \tanh(w_t h_t + b_h)$$

where $h_t$ represents an input feature, $w_t$ represents a weight coefficient matrix of the attention mechanism, and $b_h$ represents a bias of the attention mechanism.

(2) Calculation of attention weights: next, the attention scores are transformed into a probability distribution with a sum of weight coefficients equal to 1 by using a softmax function to obtain the attention weight for each time step. The calculation process is as follows:

$$a_t = \frac{\exp(S_t^T v)}{\sum_t \exp(S_t^T v)},$$

where $$S_t^T$$

represents a transpose of an attention score matrix, at represents a weight of the feature $h_t$, and v represents an attention weight value.

(3) Calculation of a weighted sum: finally, the probability distribution is multiplied by the input data of the attention mechanism layer to obtain a weighted feature representation, to thereby form the output of the attention mechanism layer. The calculation process is as follows:

$$s = \sum_t a_t h_t$$

where s represents the output result of the attention mechanism layer, $h_t$ represents the output result of the BiGRU layer which is the feature input into the attention mechanism layer, and at represents the weight of $h_t$.

The flatten layer is configured to reduce a dimension of the data output by the attention mechanism layer.

In order to facilitate inputting the output of the attention mechanism layer into the fully connected layer, the flatten layer is added after the attention mechanism layer to reduce data dimensionality. During this stage, all the time series in the output data of (b, L, 2×$g_{GRU}$) from the attention mechanism layer are no longer divided according to the specific time step L. Instead, the features are rearranged into a continuous one-dimensional vector to form an output with a dimension of (b, 2×L×$g_{GRU}$).

The fully connected layer is configured to receive data processed by the flatten layer and calculate the predicted value of the eastward velocity of the drifting buoy and the predicted values of the northward velocity of the drifting buoy through nonlinear mapping and weight learning.

The data, after dimension reduction by the flatten layer, is input into the fully connected layer. The fully connected layer combines the feature information from the flatten layer to form the final output (b, l) through the nonlinear mapping and the weight learning to thereby achieve the drift velocity prediction of the drifting buoy, and to obtain the normalized eastward velocity of the drifting buoy and the normalized northward velocity of the drifting buoy. The calculation process is as follows:

$$\text{output} = \sigma(W \cdot \text{input} + b)$$

where input represents the input data to the fully connected layer, with a dimension of (b, 2×L×$g_{GRU}$), W represents a weight matrix, b represents a bias vector, σ represents the sigmoid activation function, and output represents the output data of the fully connected layer, with a dimension of (b, l).

S4, latitude and longitude coordinates of a trajectory point of the drifting buoy are calculated based on the predicted value of the eastward velocity of the drifting buoy and the predicted value of the northward velocity of the drifting buoy.

First, the predicted values of the eastward and northward velocities of the drifting buoy obtained from the hybrid neural network prediction model are subjected to denormalization calculations by using the min-max normalization method to obtain an actual value (i.e., real value) of the eastward velocity u of the drifting buoy and an actual value of the northward velocity v of the drifting buoy, the magnitude speed and direction θ of the drift velocity of the drifting buoy are calculated based on the actual value of the eastward velocity u and the actual value of the northward velocity v, a drift distance d is obtained by performing a fourth-order Runge-Kutta time integration on the magnitude speed of the drift velocity of the drifting buoy over one time step, and finally, based on latitude and longitude coordinates (lon1, lat1) of any known previous trajectory point and the drift distance d, spherical geometry calculation on the earth are conducted to obtain a radius of a latitude cross-section and a longitude lon2 and a latitude lat2 of a predicted trajectory point.

A calculation formula of the drift velocity is as follows:

$$|\text{speed}| = \sqrt{u^2 + v^2}$$

A calculation formula of the direction θ is as follows:

$$\theta = (180/\pi) \times \arctan 2([u], [v])$$

Calculation formulas of the radius of the latitude cross-section and the longitude lon2 and the latitude lat2 of the predicted trajectory point are as follows:

$$rl = r \cdot \cos\frac{lat1}{180 \cdot \pi}$$

$$lon2 = lon1 + d \cdot \frac{\sin\frac{\theta}{180 \cdot \pi}}{2 \cdot rl \cdot \pi} \cdot 360$$

$$lat2 = lat1 + d \cdot \frac{\cos\frac{\theta}{180 \cdot \pi}}{2 \cdot rl \cdot \pi} \cdot 360$$

where u represents the actual value of the eastward velocity, v represents the actual value of the northward velocity, lon1 represents the longitude coordinate of the known starting point, lat1 represents the latitude coordinate of the known starting point, lon2 represents the longitude coordinate of the point to be calculated, lat2 represents the latitude coordinate of the point to be calculated, rl represents the radius of the latitude cross-section of the earth, r represents a radius of the earth, d represents the drift distance of the drifting buoy, and θ represents the drift direction of the drifting buoy.

S5, the latitude and longitude coordinates of trajectory points of the drifting buoy at multiple future time points in chronological order are predicted by repeating the step S1 to the step S4 to obtain a sequence of trajectory point coordinates to thereby achieve trajectory prediction of the drifting buoy over a target future period.

The steps S1-S4 describe a prediction process for a single trajectory point. The implementation steps for predicting the latitude and longitude coordinates of multiple trajectory points in a trajectory sequence are to repeatedly execute the content from the input layer to the fully connected layer to obtain the predicted values of the eastward and northward velocities of the drifting buoy at multiple time points. Subsequently, the latitude and longitude coordinates are calculated for each time point based on the predicted values of the eastward and northward velocities. The sequence of these latitude and longitude coordinate points constitutes the predicted trajectory of the drifting buoy.

Figure 5:
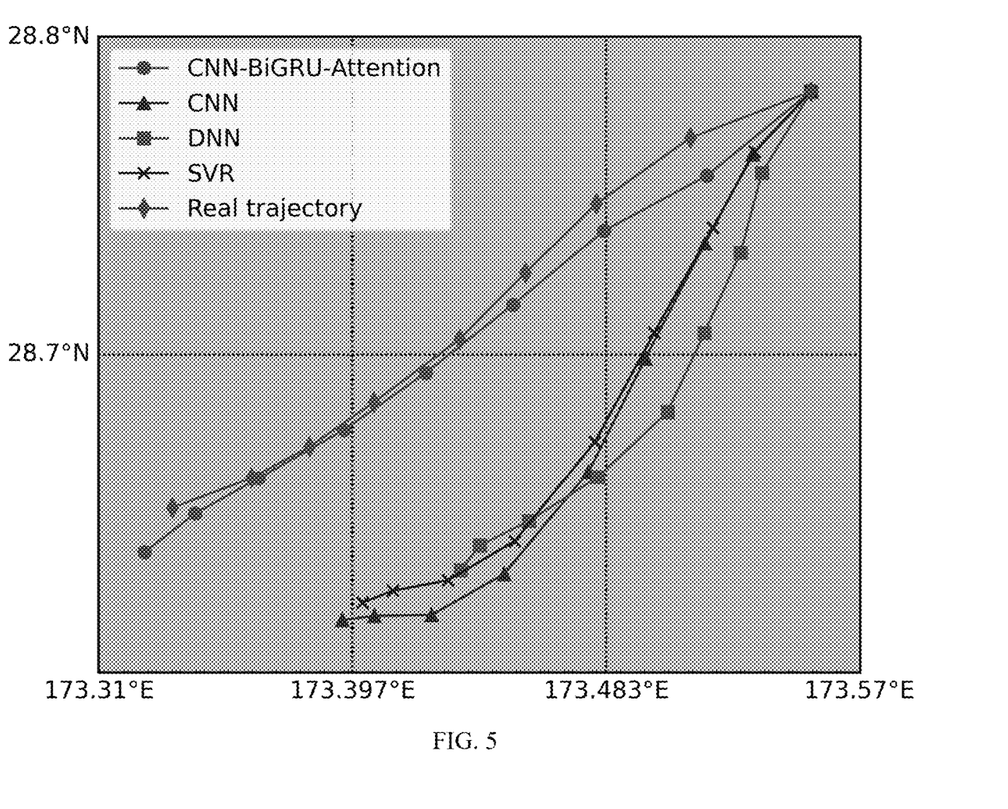
FIG. 5 illustrates a schematic diagram of a drifting buoy trajectory prediction result using the drifting buoy trajectory prediction method of the disclosure for a 24-hour period.
Figure 6:
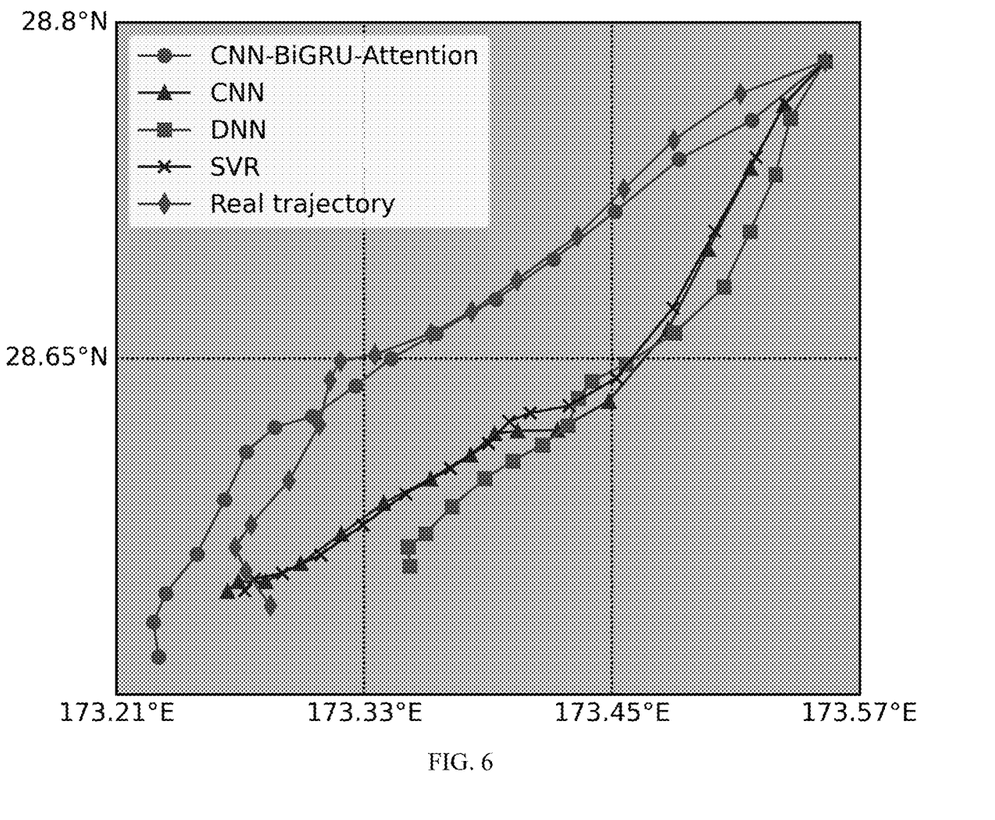
FIG. 6 illustrates a schematic diagram of a drifting buoy trajectory prediction result using the drifting buoy trajectory prediction method of the disclosure for a 48-hour period.
Figure 7:
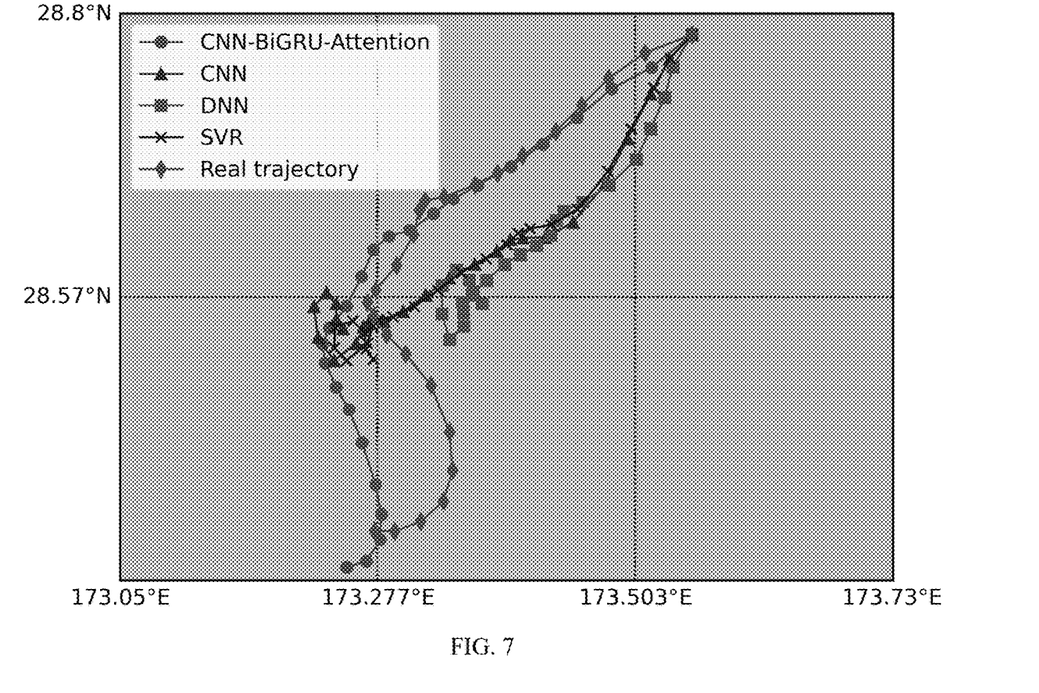
FIG. 7 illustrates a schematic diagram of a drifting buoy trajectory prediction result using the drifting buoy trajectory prediction method of the disclosure for a 72-hour period.

FIG. 5 to FIG. 7 show the drifting buoy trajectory prediction results for 24 hours, 48 hours, and 72 hours, respectively. In these figures, a line with rhombuses represents a real trajectory, a line with circles represents the predicted trajectory obtained using the CNN-BiGRU-Attention hybrid neural network model, and lines with triangles, rectangles and X-shapes represent predicted trajectories obtained using traditional machine learning algorithms including CNN, deep neural network (DNN), and support vector regression (SVR) respectively. It can be seen from FIG. 5 to FIG. 7 that, the trajectories predicted by the CNN-BiGRU-Attention model (indicated by the lines with rhombuses) are the closest to the real drift trajectories of the drifting buoy. As the prediction duration increases, the deviation between the predicted trajectories and the real trajectories becomes larger. However, the CNN-BiGRU-Attention model consistently exhibits the smallest deviation. In contrast, the trajectories predicted by the CNN, DNN, and SVR models show a significant deviation from the real trajectories, which becomes more pronounced as the prediction duration increases. Additionally, the trend and direction of the trajectories predicted by the CNN-BiGRU-Attention model (manifested by the shape and curvature of the trajectory lines) are highly consistent with the real trajectories, and the consistency is maintained even as the prediction duration increases. The other models do not possess such advantage.

In the description herein, the reference terms "an embodiment", "some embodiments", "illustrative embodiments", "examples", "specific examples", or "some examples" refer to the specific features, structures, materials, or characteristics described in conjunction with the embodiments or examples included in at least one embodiment or example of the disclosure.

Herein, the illustrative expressions of the above terms may not necessarily refer to the same implementation or examples. Moreover, the specific features, structures, materials, or characteristics described can be combined in any one or more embodiments or examples in a suitable manner.

The above embodiments are only used to illustrate the technical solution of the disclosure, and not to limit it; Although the disclosure has been described in detail with reference to the illustrated embodiments, it is still possible for those skilled in the art to amend the technical solutions described in the illustrated embodiments, or to equivalently replace some of the technical features therein; And these amendments or substitutions do not depart from the essence and scope of the technical solution required to be protected by the disclosure.

What is claimed is:

1. A drifting buoy trajectory prediction method based on a hybrid neural network prediction model, comprising steps as follows:

S1, obtaining marine environmental data and historical trajectory data of a drifting buoy within a same spatiotemporal range respectively from an operational research institution and a global drifter program data center;

S2, performing preprocessing on the marine environmental data and the historical trajectory data of the drifting buoy to obtain input data configured to predict a northward velocity of the drifting buoy and input data configured to predict an eastward velocity of the drifting buoy, wherein the preforming preprocessing comprises: missing data filling, data upsampling, spatial interpolation, data spatiotemporal alignment, and normalization calculations;

S3, injecting the input data configured to predict the northward velocity of the drifting buoy into the hybrid neural network prediction model to obtain a predicted value of the northward velocity of the drifting buoy, and injecting the input data configured to predict the eastward velocity of the drifting buoy into the hybrid neural network prediction model to obtain a predicted value of the eastward velocity of the drifting buoy, wherein the hybrid neural network prediction model is embodied by at least one processor and at least one memory coupled to the at least one processor and comprises:

an input layer, configured to extract the marine environmental data, historical data of the northward velocity of the drifting buoy and historical data of the eastward velocity of the drifting buoy to obtain sample data, comprising:

extracting the marine environmental data, extracting historical drift velocities of the drifting buoy from the historical trajectory data of the drifting buoy, performing spatiotemporal alignment on the extracted marine environmental data with the extracted historical drift velocities of the drifting buoy to make each of the extracted marine environmental data correspond to a corresponding drift velocity of the extracted historical drift velocities of the drifting buoy at a corresponding moment and obtain spatiotemporal aligned marine environmental data and spatiotemporal aligned historical drift velocities of the drifting buoy, and taking the spatiotemporal aligned marine environmental data and the spatiotemporal aligned historical drift velocities of the drifting buoy as sample features and the spatiotemporal aligned historical drift velocities of the drifting buoy respectively corresponding to the spatiotemporal aligned marine environmental data as sample labels to form data in a shape of (n, m), where n represents a sample number, and m represents an attribute feature dimension;

normalizing the sample features and the sample labels by a min-max normalization method to obtain normalized data with dimensions (n, m), wherein a formula for the min-max normalization method is as follows:

$$x' = \frac{x - \min(x)}{\max(x) - \min(x)}$$

where x' represents a normalized value as the normalized data, x represents a value of the sample data, min (x) represents a minimum value of the value of the sample data, and max (x) represents a maximum value of the value of the sample data; and performing mini-batch splitting on the normalized data to obtain mini-batch samples corresponding multiple batches, as the sample data, wherein a size of each of the multiple batches is b, a number of the mini-batch samples is ((n/b)+1), and the mini-batch samples have a shape of (b, L, m), where b represents the size of each of the multiple batches, L represents a time step length, and m represents the attribute feature dimension;

a convolutional neural network (CNN) layer, configured to extract features from the sample data input by the input layer according to a formula expressed as follows:

$$v_{i,j}^l = \delta\left(\sum_{k=0}^{F-1}\sum_{m=0}^{F-1} w_{k,m} v_{i+k,j+m}^{l-1}\right)$$

where F represents a number of rows of a convolutional kernel and also represents a number of columns of the convolutional kernel, $v_{i,j}^l$ represents a value at an i-th row and a j-th column of an l-th layer of the sample data, $w_{k,m}$ represents a weight value at a k-th row and an m-th column of the convolutional kernel of the sample data, δ represents an activation function, and $$v_{i+k,j+m}^{l-1}$$

represents a value at an i+k-th row and a j+m-th column of an l−1-th layer of the sample data;

a bidirectional gated recurrent unit (BiGRU) layer, configured to extract temporal features from data output by the CNN layer according to a formula expressed as follows:

$$h_t = (1 - z_t) \odot h_{t-1} + z_t \tilde{h}_t$$

where $h_t$ represents an output result of the BiGRU layer, $z_t$ represents an output result of an update gate, $h_{t-1}$ represents a hidden state at time t−1, and $\tilde{h}_t$ represents a candidate state, wherein the BiGRU layer comprises gated recurrent units (GRUs) operating in forward and backward directions configured to train on forward and backward sequences of same data, and capture temporal features of the marine environmental data from past and future directions simultaneously;

an attention mechanism layer, configured to focus on key factors affecting drift of the drifting buoy from data output by the BiGRU layer;

a flatten layer, configured to reduce a dimension of data output by the attention mechanism layer; and a fully connected layer, configured to receive processed data output by the flatten layer and calculate, based on the processed data, the predicted value of the eastward velocity of the drifting buoy and the predicted value of the northward velocity of the drifting buoy;

S4, calculating latitude and longitude coordinates of a trajectory point of the drifting buoy based on the predicted value of the eastward velocity of the drifting buoy and the predicted value of the northward velocity of the drifting buoy;

S5, predicting, by repeating the step S1 to the step S4, latitude and longitude coordinates of trajectory points of the drifting buoy at a plurality of future time points in chronological order to obtain a sequence of trajectory point coordinates to thereby achieve trajectory prediction of the drifting buoy over a target future period; and S6, determining, based on the sequence of trajectory point coordinates, a predicted trajectory of the drifting buoy, determining a sailing route of a ship based on the predicted trajectory of the drifting buoy, and controlling the ship to sail along the sailing route to avoid navigation risks and ensure navigation safety.

2. The drifting buoy trajectory prediction method based on the hybrid neural network prediction model as claimed in claim 1, wherein in the step S1, the marine environmental data comprises: forecast values of wave, a water temperature, surface current, profile current, and a sea surface height.

3. The drifting buoy trajectory prediction method based on the hybrid neural network prediction model as claimed in claim 1, wherein in the step S2, the preforming preprocessing on the marine environmental data and the historical trajectory data of the drifting buoy to obtain input data configured to predict a northward velocity of the drifting buoy and input data configured to predict an eastward velocity of the drifting buoy comprises:

calculating, according to latitude and longitude coordinates of trajectory points of the historical trajectory data of the drifting buoy, the historical drift velocities of the drifting buoy;

calculating the historical data of the northward velocity of the drifting buoy and the historical data of the eastward velocity of the drifting buoy from the historical drift velocities of the drifting buoy;

combining the historical data of the northward velocity of the drifting buoy with the marine environmental data obtained in the step S1 to obtain the input data configured to predict the northward velocity of the drifting buoy, and combining the historical data of the eastward velocity of the drifting buoy with the marine environmental data obtained in the step S1 to obtain the input data configured to predict the eastward velocity of the drifting buoy.

4. The drifting buoy trajectory prediction method based on the hybrid neural network prediction model as claimed in claim 1, wherein the sample data comprises the sample features and the sample labels, the sample features comprise the spatiotemporal aligned marine environmental data and the spatiotemporal aligned historical drift velocities, and the sample labels comprise the spatiotemporal aligned historical drift velocities of the drifting buoy corresponding to the spatiotemporal aligned marine environmental data.

5. The drifting buoy trajectory prediction method based on the hybrid neural network prediction model as claimed in claim 1, wherein the attention mechanism layer is configured to focus on the key factors affecting the drift of the drifting buoy from the data output by the BiGRU layer as follows:

$$s = \sum_t a_t h_t$$

where s represents an output result of the attention mechanism layer, $h_t$ represents the output result of the BiGRU layer which is input into the attention mechanism layer, and at represents a weight of $h_t$.

6. The drifting buoy trajectory prediction method based on the hybrid neural network prediction model as claimed in claim 1, wherein the step S5 comprises:

performing denormalization through the min-max normalization method on the predicted value of the eastward velocity of the drifting buoy and the predicted value of the northward velocity of the drifting buoy to obtain an actual value of the eastward velocity of the drifting buoy and an actual value of the northward velocity of the drifting buoy, calculating a drift velocity and a vector of the drifting buoy, calculating a drift distance of the drifting buoy through fourth-order Runge-Kutta time integration, and obtaining, through spherical geometry calculation, the latitude and longitude coordinates of the trajectory points of the drifting buoy and the sequence of trajectory point coordinates, wherein the sequence of trajectory point coordinates is a predicted trajectory of the drifting buoy.

7. A drifting buoy trajectory prediction method based on a hybrid neural network prediction model, implemented by a computer comprising a processor, a memory connected to the processor, and a display connected to the processor, comprising steps as follows:

S1, obtaining marine environmental data and historical trajectory data of a drifting buoy within a same spatiotemporal range respectively from an operational research institution and a global drifter program data center;

S2, performing preprocessing on the marine environmental data and the historical trajectory data of the drifting buoy to obtain input data configured to predict a northward velocity of the drifting buoy and input data configured to predict an eastward velocity of the drifting buoy, wherein the preforming preprocessing comprises: missing data filling, data upsampling, spatial interpolation, data spatiotemporal alignment, and normalization calculations;

S3, injecting the input data configured to predict the northward velocity of the drifting buoy into the hybrid neural network prediction model to obtain a predicted value of the northward velocity of the drifting buoy, and injecting the input data configured to predict the eastward velocity of the drifting buoy into the hybrid neural network prediction model to obtain a predicted value of the eastward velocity of the drifting buoy, wherein the hybrid neural network prediction model comprises:
an input layer, configured to extract the marine environmental data, historical data of the northward velocity of the drifting buoy and historical data of the eastward velocity of the drifting buoy to obtain sample data, comprising:
extracting the marine environmental data, performing spatiotemporal alignment on the extracted marine environmental data with latitude and longitude coordinates of trajectory points of the historical trajectory data of the drifting buoy to make each of the extracted marine environmental data correspond to a corresponding drift position of the drifting buoy at a corresponding moment to obtain spatiotemporal aligned marine environmental data, extracting historical drift velocities of the drifting buoy from the latitude and longitude coordinates of the trajectory points of the historical trajectory data of the drifting buoy, aligning the extracted historical drift velocities of the drifting buoy to the spatiotemporal aligned marine environmental data according to timestamps to obtain spatiotemporal aligned historical drift velocities of the drifting buoy, and taking the spatiotemporal aligned marine environmental data and the spatiotemporal aligned historical drift velocities of the drifting buoy as sample features and the spatiotemporal aligned historical drift velocities of the drifting buoy respectively corresponding to the spatiotemporal aligned marine environmental data as sample labels to form data in a shape of (n, m), where n represents a sample number, and m represents an attribute feature dimension;
normalizing the sample features and the sample labels by a min-max normalization method to obtain normalized data with dimensions (n, m), wherein a formula for the min-max normalization method is as follows:

$$x' = \frac{x - \min(x)}{\max(x) - \min(x)}$$

where x' represents a normalized value as the normalized data, x represents a value of the sample data, min (x) represents a minimum value of the value of the sample data, and max (x) represents a maximum value of the value of the sample data; and
performing mini-batch splitting on the normalized data to obtain mini-batch samples corresponding multiple batches, as the sample data, wherein a size of each of the multiple batches is b, a number of the mini-batch samples is ((n/b)+1), and the mini-batch samples have a shape of (b, L, m), where b represents the size of each of the multiple batches, L represents a time step length, and m represents the attribute feature dimension;
a convolutional neural network (CNN) layer, configured to extract features from the sample data input by the input layer according to a formula expressed as follows:

$$v_{i,j}^l = \delta\left(\sum_{k=0}^{F-1}\sum_{m=0}^{F-1} w_{k,m} V_{i+k,j+m}^{l-1}\right)$$

where F represents a number of rows of a convolutional kernel and also represents a number of columns of the convolutional kernel, $v_{i,j}^l$ represents a value at an i-th row and a j-th column of an l-th layer of the sample data, $w_{k,m}$ represents a weight value at a k-th row and an m-th column of the convolutional kernel of the sample data, δ represents an activation function, and $$V_{i+k,j+m}^{l-1}$$

represents a value at an i+k-th row and a j+m-th column of an l−1-th layer of the sample data;
a bidirectional gated recurrent unit (BiGRU) layer, configured to extract temporal features from data output by the CNN layer according to a formula expressed as follows:

$$h_t = (1 - z_t) \odot h_{t-1} + z_t \odot \tilde{h}_t$$

where $h_t$ represents an output result of the BiGRU layer, $z_t$ represents an output result of an update gate, $h_{t-1}$ represents a hidden state at time t−1, and $\tilde{h}_t$ represents a candidate state,
wherein the BiGRU layer comprises gated recurrent units (GRUs) operating in forward and backward directions configured to train on forward and backward sequences of same data, and capture temporal features of the marine environmental data from past and future directions simultaneously;
an attention mechanism layer, configured to focus on key factors affecting drift of the drifting buoy from data output by the BiGRU layer;
a flatten layer, configured to reduce a dimension of data output by the attention mechanism layer; and
a fully connected layer, configured to receive processed data output by the flatten layer and calculate, based on the processed data, the predicted value of the eastward velocity of the drifting buoy and the predicted value of the northward velocity of the drifting buoy;
S4, calculating latitude and longitude coordinates of a trajectory point of the drifting buoy based on the predicted value of the eastward velocity of the drifting buoy and the predicted value of the northward velocity of the drifting buoy;
S5, predicting, by repeating the step S1 to the step S4, latitude and longitude coordinates of trajectory points of the drifting buoy at a plurality of future time points in chronological order to obtain a sequence of trajectory point coordinates to thereby achieve trajectory prediction of the drifting buoy over a target future period; and
S6, determining by the computer, based on the sequence of trajectory point coordinates, a predicted trajectory of the drifting buoy; determining by the computer, based on the predicted trajectory, a safe navigation area and a dangerous navigation area and generating early warning information containing the safe navigation area and the dangerous navigation area; sending, by the computer, the early warning information to a mobile device of a seafarer; and displaying the early warning information on a map displayed on a display of the mobile device for reminding the seafarer to navigate within the safe navigation area and avoid the dangerous navigation area.

\* \* \* \* \*